D. G. TIFFANY.
VEHICLE DRIVE TRANSMISSION SYSTEM.
APPLICATION FILED JUNE 15, 1920.
1,424,951.
Patented Aug. 8, 1922.
2 SHEETS—SHEET 1.
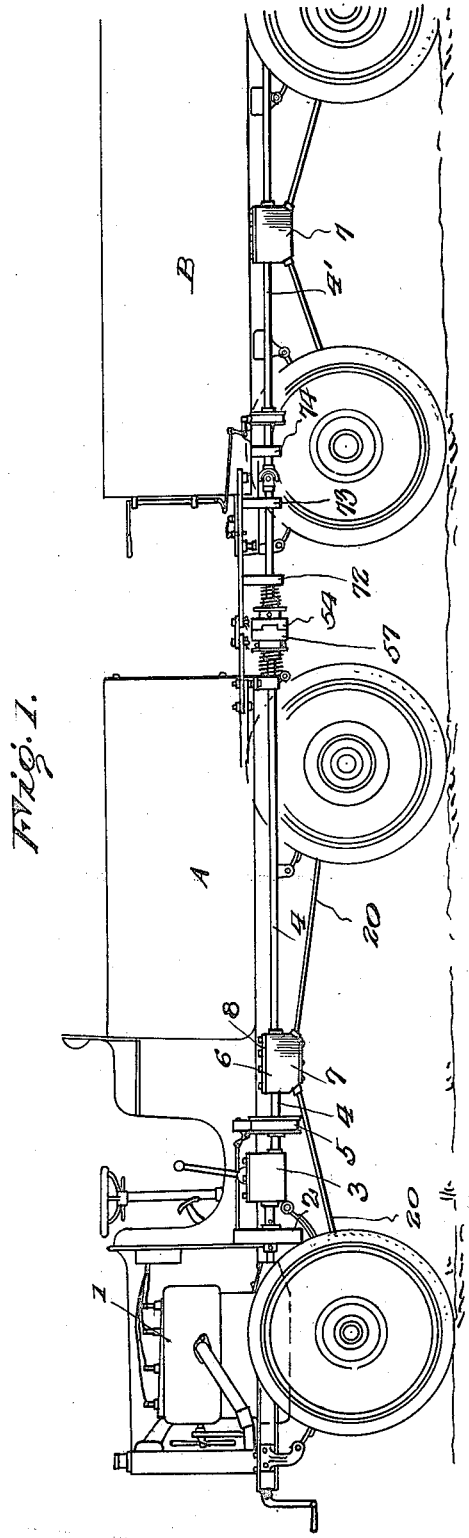
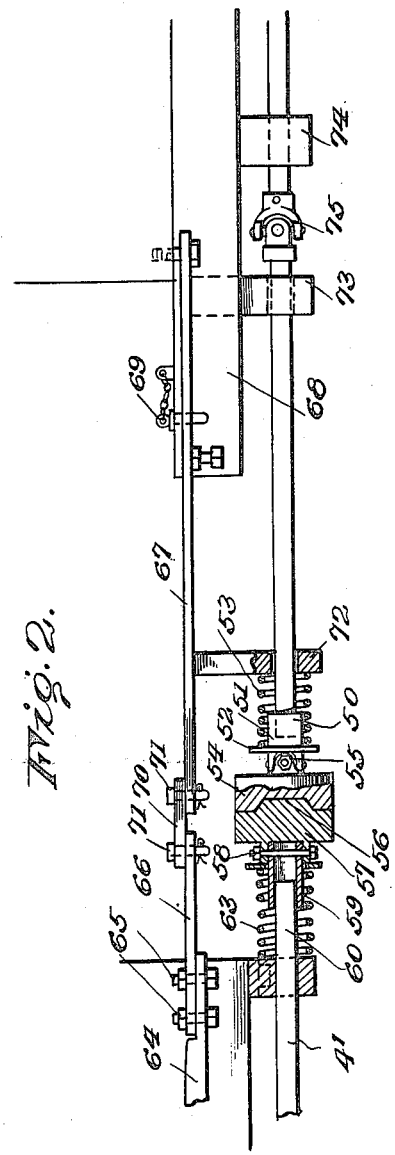
Inventor
D. G. Tiffany.
By Lacey & Lacey, Attorneys D. G. TIFFANY.
VEHICLE DRIVE TRANSMISSION SYSTEM.
APPLICATION FILED JUNE 15, 1920.
1,424,951.
Patented Aug. 8, 1922.
2 SHEETS—SHEET 2.
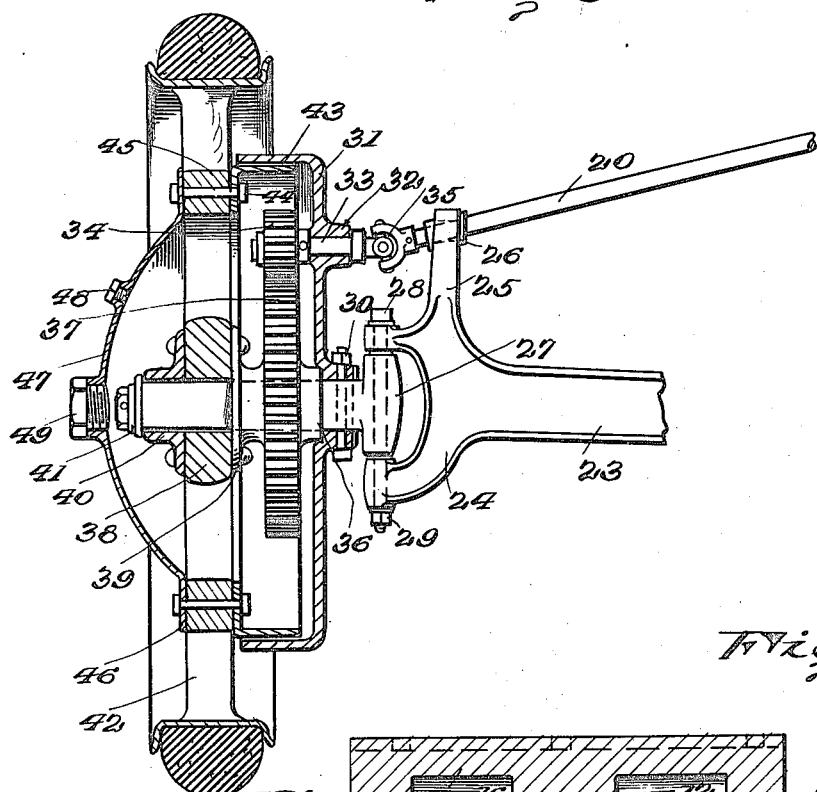
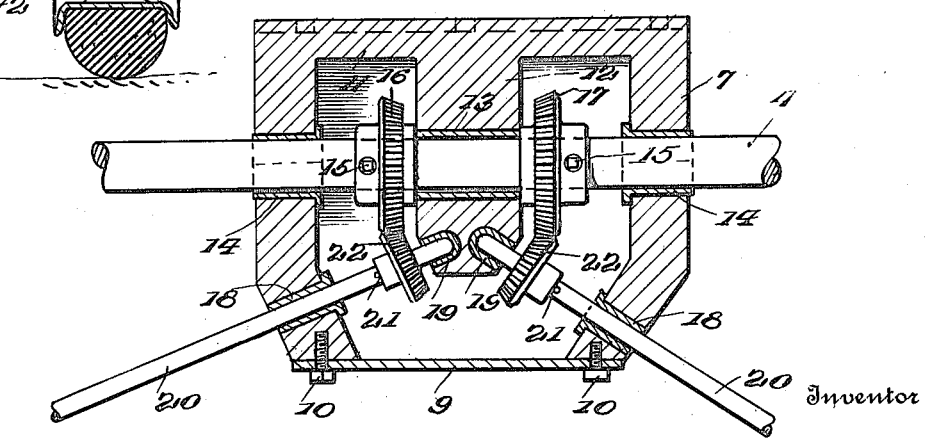
Inventor
D. G. Tiffany
By Lacey & Lacey, Attorneys

UNITED STATES PATENT OFFICE.

DON G. TIFFANY, OF NEWARK, MICHIGAN, ASSIGNOR TO WALTER W. JONES, OF FLINT, MICHIGAN.

VEHICLE DRIVE TRANSMISSION SYSTEM.

1,424,951.            Specification of Letters Patent.      Patented Aug. 8, 1922.

Application filed June 15, 1920. Serial No. 389,157.

*To all whom it may concern:*

Be it known that I, DON G. TIFFANY, a citizen of the United States, residing at Newark, in the county of Oakland and State of Michigan, have invented certain new and useful Improvements in Vehicle Drive Transmission Systems, of which the following is a specification.

This invention relates to a drive system for motor vehicles and trailers.

The invention has as one object thereof, the provision of a vehicle of the four-wheel drive type and provided with means for imparting power to a trailer vehicle connected with the motive power vehicle.

More particularly speaking, the invention resides in the provision of a four-wheel drive vehicle adapted for connection with one or more trailers and having power take-off means whereby connection may be made with a driving mechanism on the trailer, and each trailer having a similar power take-off mechanism so that a train of such trailers constitutes a plurality of sets of driving wheels, thereby increasing the efficiency of the driving medium.

The invention further consists in the provision of a particular type of four-wheel drive.

In the drawings:

Figure 1 is a side elevation, partly in phantom, of a vehicle and trailer constructed according to the present invention, Figure 2 is a fragmentary sectional view of the draft bar and draft bar drive coupling for the trailer, Figure 3 is a vertical section through one of the drive wheels, Figure 4 is a vertical section longitudinally through the four-wheel drive gear box.

In the drawings, the motive power vehicle is indicated at A and is connected up through means to be herein after described with a trailer B.

The motive power vehicle and trailer B have identical driving mechanism incorporated therein with the exception that the motive power vehicle carries an engine 1 having a fly wheel 2 and a transmission gear change set 3, the propeller shaft 4 of the vehicle carrying a brake 5 of any usual type. However, the propeller shaft 4 is continued on through a four-wheel drive gear box, indicated in general at 6, and which consists of a casing 7 having a cover 8 suitably secured in place by bolts or the like. The bottom of the gear box 6 is also open but may be closed by a plate 9 secured in place by bolts or the like 10. The gear box 6 is cast with a central web 11 having depending member 12 through which the bushing 13 extends, bushings 14 being provided at each side of the case and the propeller shaft 4 extends through the bushings 13 and 14. Mounted on the propeller shaft 4 at each side of the depending member 12 and secured in place by pins 15, keys, or the like, are the bevel pinions 16 and 17. Extending outwardly from each end of the gear box 6 and passing through bushings 18 and seated at their inner ends in bushing thimbles 19, are the drive shafts 20 which, at their inner ends, have secured thereto, by keys 21, the bevel pinions 22 meshing at all times with the pinions 16 and 17 so that driving of the propeller shaft 4 also drives the drive shafts 20. These drive shafts of each vehicle, as now to be explained, are connected with the driving wheels of the vehicles respectively.

The axles of the vehicles may be of the usual I-beam section, as indicated at 23, and each axle has formed integral with each end thereof the steering knuckle fork 24 and a vertical extension or post 25 carrying a bushing 26 through which one of the shafts 20 extends. The axle spindle is formed in the usual manner with a vertical bearing portion 27 receiving the king bolt 28 extending through the fork 24 and fastened by a nut 29. Secured to the axle spindle by suitable securing means such as a bolt 30, is a drum housing 31 having a boss 32 bored out to receive a stub shaft 33 having fixed to the end thereof a pinion 34. The stub shaft 33 is connected to the driving shaft 20 by means of a suitable universal joint 35. Pinned, keyed, or otherwise secured to the wheel hub, as indicated at 36, is a gear 37 meshing with the pinion 34, the hub being indicated at 38 and having cheek plates 39 and 40, a suitable fastening means such as a nut 41 being provided for maintaining the wheel in position on the axle spindle. Secured to the spokes 42 of the wheel, is a ring member 43 held in place by bolts 44 and telescoping within the drum 31; intermediate the spokes is formed the annulus 45 against which is seated the flange 46 of a bulged cover plate 47, thus forming a complete grease retaining enclosure for the driving gears, the only openings provided being closed by a plug 48 for grease filling and a hub nut 49 affording access to the nut 41. Any suitable type of steering mechanism may be used in connection with the construction just previously described.

The propeller shaft 4 extends clear through each vehicle to the rear end of the same, and, in the case of the trailer B, the propeller shaft 4' extends from end to end of the vehicle and at each end a squared portion 50 has slipped thereon a sleeve 51 carrying a flange 52 behind which is seated a spring 53 forming a cushioning element, and a head 54 is bolted thereto, as indicated at 55, said head having a groove cooperating with a tongue 56 on a head 57, bolted at 58, to the sleeve 59 on a squared end 60 of a propeller shaft 4' and formed into a resilient mounting by a spring 63, as just previously described.

The opposite ends of the vehicles carry different connecting heads so that in coupling one vehicle to another it is only necessary to bring the proper ends of the vehicles together. Running lengthwise of the frame of each vehicle is a member 64 to which is secured, by means of bolts 65 provided with suitable nuts, a draft bar 66 which is linked to a draft bar 67 of the next succeeding vehicle, which draft bar may be held in place on the draft beam 68 by a suitable removable pin 69, a short link 70 held by pins 71 permitting relative turning movement of the vehicles with respect to each other. Supports 72, 73 and 74 provide journals for carrying the length of propeller shafting necessary for connecting the vehicles together, and a universal joint 75 is interposed between the supports 73 and 74.

I claim:

1. The combination with a main motive power vehicle and a series of trailers, of a driving system therefor including means connecting the ground engaging elements of all the vehicles in driving relation with the main motive power vehicle, and couplings included in the said driving system between the vehicles locally movable in a direction longitudinally of the vehicles.

2. The combination with a main motive power vehicle and a series of trailers, of driving means therefor including means connecting the ground engaging elements of all of the vehicles in driving relation with the main motive power vehicle, and couplings included in said driving system between the vehicles yieldably pressed into coupling relation.

3. The combination with a main motive power vehicle and a series of trailers, of driving means therefor including means connecting the ground engaging elements of all of the vehicles in driving relation with the main motive power vehicle, and spring pressed couplings included in the said driving system between the vehicles.

4. The combination with a main motive power vehicle, and a series of trailers, of a driving system therefor including propeller shafts upon the power vehicle and said trailers, and coacting heads upon the shafts coupling said shafts and locally movable longitudinally thereof.

5. The combination with a main motive power vehicle, and a series of trailers, of driving means therefor including propeller shafts upon the power vehicle and said trailers, coacting heads upon the shafts coupling said shafts, and yieldable means pressing the heads into engagement with each other.

6. The combination with a main motive power vehicle, and a series of trailers, of driving means therefor including propeller shafts upon the power vehicle and said trailers, sleeves having driving connection with said shafts but mounted to slide thereon, coacting heads fixed upon the sleeves coupling the shafts, and yieldable means pressing the heads into engagement with each other.

7. The combination with a main motive power vehicle, and a series of trailers, of a driving system therefor including propeller shafts upon the power vehicle and said trailers, sleeves having driving connection with the shafts but slidable thereon, the sleeves being provided with collars, coacting heads fixed to said sleeves coupling the shafts, and springs bearing against said collars pressing the heads into engagement with each other.

In testimony whereof I affix my signature.

DON G. TIFFANY. [L. S.]